UNITED STATES PATENT OFFICE.

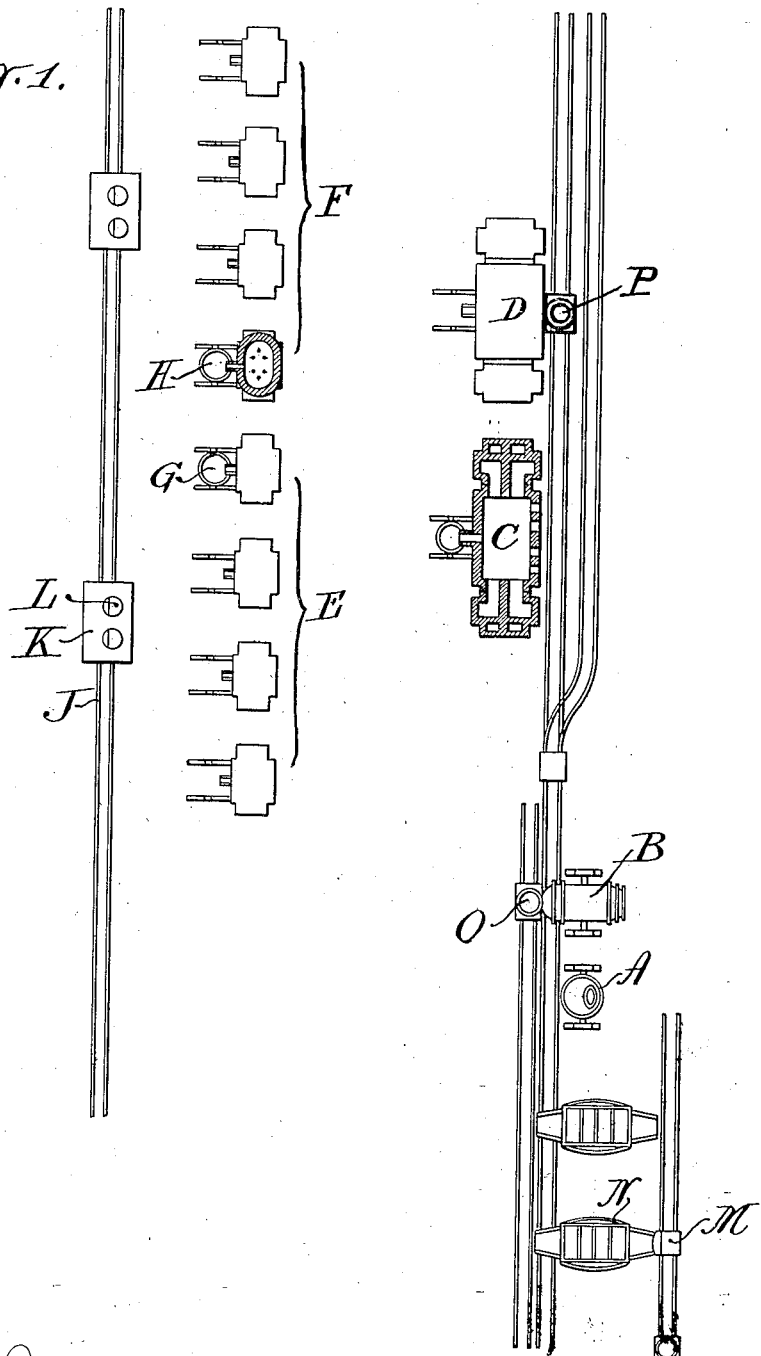

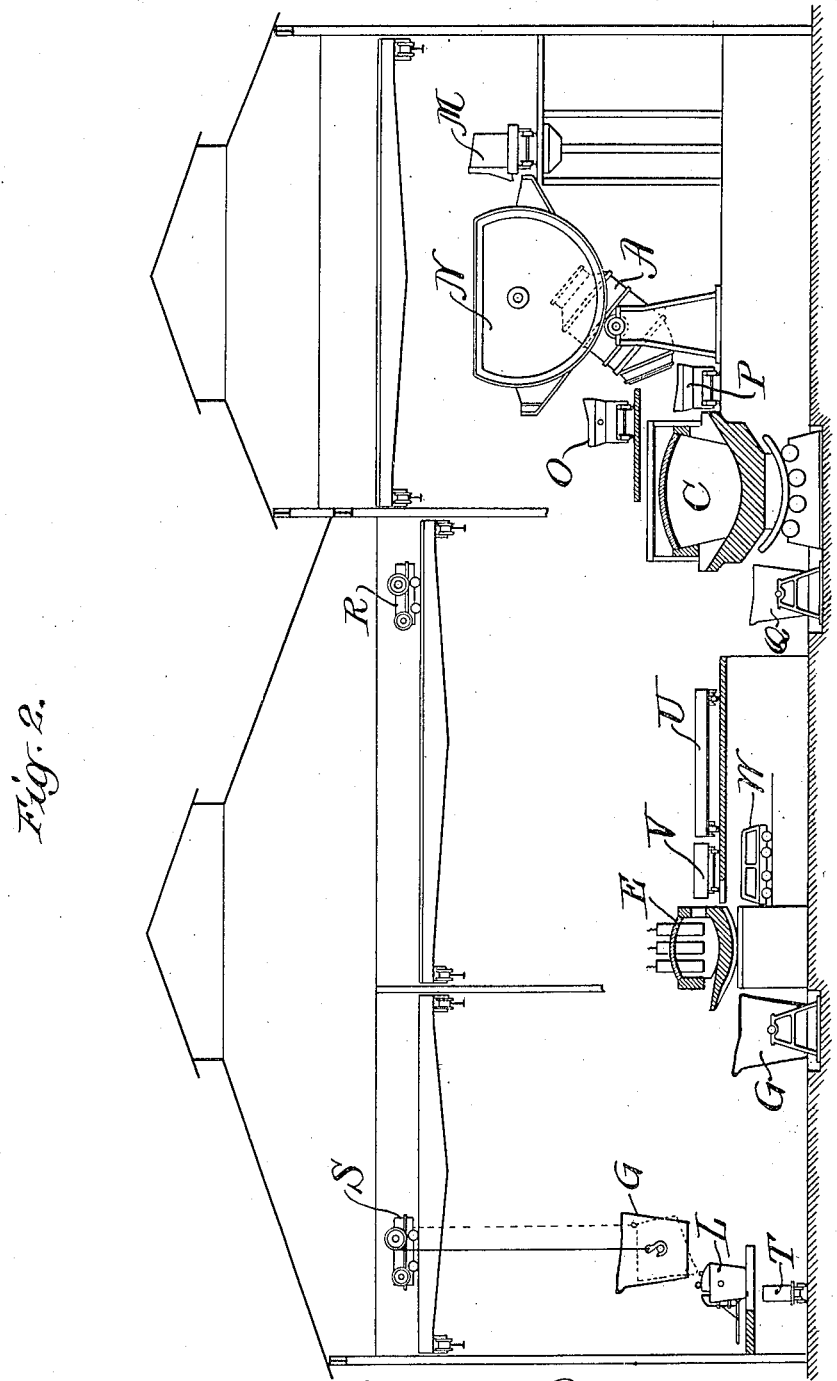

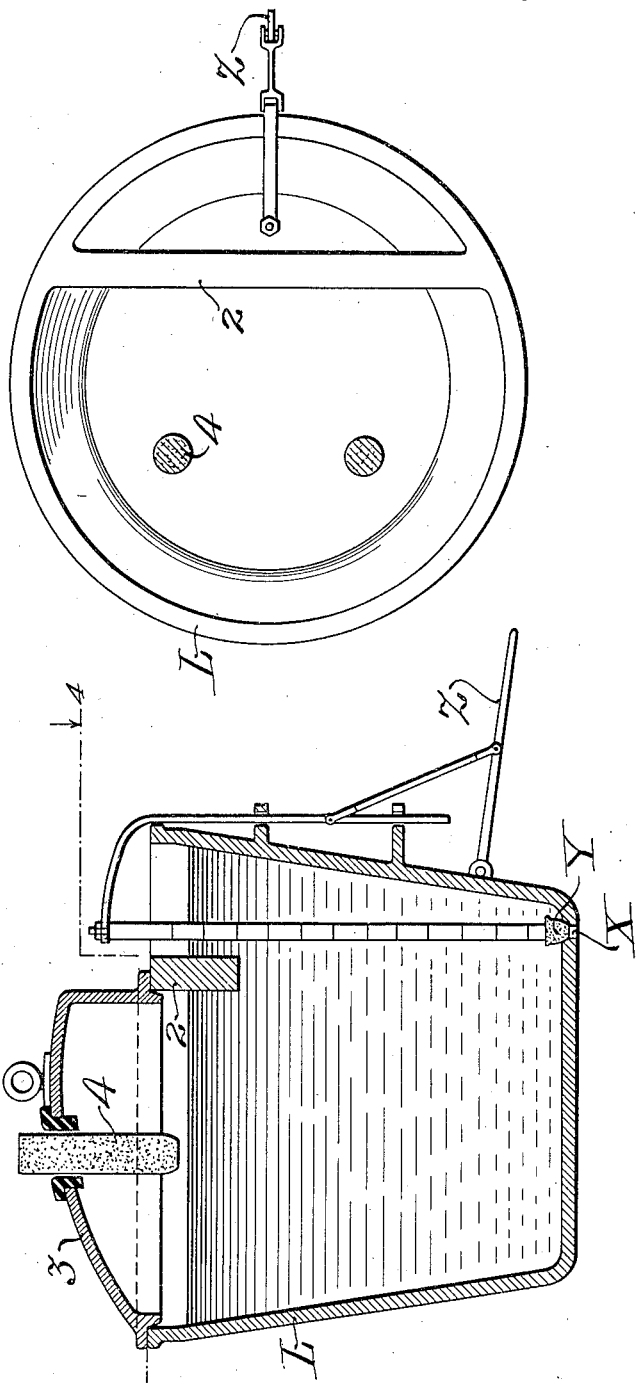

WILLIAM R. WALKER, OF NEW YORK, N. Y.

MANUFACTURE OF STEEL.

1,035,280.      Specification of Letters Patent.      Patented Aug. 13, 1912.

Application filed April 28, 1911. Serial No. 623,908.

*To all whom it may concern:*

Be it known that I, WILLIAM R. WALKER, a citizen of the United States, and a resident of the borough of Manhattan, city, county, and State of New York, have invented certain new and useful Improvements in the Manufacture of Steel, of which the following is a specification.

My invention relates to the use of electric furnaces in combination with combustion furnaces, such as an open hearth furnace or Bessemer converters, for making and finishing steel or the like.

The object of the invention is to reduce the cost of the steel; to make steel of a more uniform carbon-content even in the usually difficult case of low-carbon steel; and to effect a nearly complete removal of slag; especially what may be called "microscopic slag," disseminated through the bath of molten steel coming from the electric furnace.

A further object is to shorten the period for retaining the steel in the electric finishing furnace, and give better dissemination of the additions.

In carrying out the first named objects, I employ a mixer, preferably in the form of a mixing ladle with an acid lining, which may or may not be heated by electrodes, or otherwise, this mixer receiving the steel from several electric furnaces and preferably traveling in front of them. A constant pool of steel is kept in this steel mixer, so that as the metal is tapped from an electric furnace into the pool it is mixed therein with other steel; and portions of the pool are taken from the mixer as desired, to teem into the molds, the pool being constantly maintained in the mixer. In this mixer also small additions may be made, such for example as carbon, to bring the metal up to the desired content. I also prefer to employ a mixer or mixers between the converters or open hearth furnaces and the electric furnaces, so as to secure more uniform metal for supplying to the electric furnaces. These mixers feeding to the electric furnaces are preferably lined with basic or neutral material so that a certain degree of dephosphorizing may be carried out therein with a suitable slag (and incidentally desulfurizing).

By the use of this system I am enabled to keep the electric furnaces in substantially continuous operation, steel always being ready to be fed thereto when one of the electric furnaces is emptied; and on the other hand the final mixer always being ready to receive the steel from one of the electric furnaces. When the electric furnace is not in use it cools rapidly and there is no convenient means for keeping it hot. The maintaining of a continuous supply of molten metal reduces to a minimum the time during which the electric furnace is permitted to cool. The providing of the pool in the final mixer gives a more uniform carbon-content in the finished steel fed into the molds, owing to the mixing action; while the providing of the constant pool gives a further refining action by more thoroughly disseminating the additions and also by allowing the slag to separate more thoroughly from the steel and rise to the surface. What I have termed "microscopic slag" is thus more completely eliminated from the steel, such slag tending to impair the quality of the steel and interfere with the after operations on the ingots. The use of this pool following the electric finishing treatment also enables me to shorten the time for treatment in the electric furnaces, since the heat of the steel coming from the furnaces is so high that the refining will continue in the mixer, and the metal may be tapped or poured from the electric furnace at an earlier stage than heretofore. The treatment in the electric furnace is the most expensive of the several steps employed. By carrying on the last degree of refinement in the mixing ladle, the time of using the electric furnace is curtailed for each melt, or the product is carried to a higher degree of refinement. This finishing mixer also serves to reduce the temperature of the electric steel to a better temperature for teeming into the ingot molds.

As to further objects of my invention, I propose to use an acid lined electric furnace, which is cheaper both in first cost and in cost of repairs, and gives a greater output in a given time than a basic lined electric furnace, and can therefore be worked with lower costs of labor and of current per ton of product. With such an electric furnace I propose to employ a basic lined converter in which the molten pig is dephosphorized; and in which the additional cost over an acid lined converter is comparatively small;—this being more than overcome by the saving in the cost of operating the electric furnace. Moreover, in this system the converter may be used to give merely a roughing-down operation; the metal not being as completely blown or carefully finished as in previous basic converter work. A bauxite or other neutral lining may be substituted for the acid lining of the electric furnace in special cases.

It will be understood that my system and process may be employed, however, with basic lined electric furnaces receiving metal from converters or open hearth furnaces, within the scope of my broader claims; and that the acid electric furnace may be employed with the basic converter with or without the other steps of the process specifically described.

The stationary mixers described, as well as the mixing ladles, may be heated electrically or otherwise.

The accompanying drawings illustrate a suitable arrangement of apparatus for carrying out the invention.

Figure 1 is a plan partly in section of a complete plant for carrying out the operations from the Bessemer converters to the ingot molds, omitting certain ladles, charging apparatus and slag cars. Fig. 2 is a transverse view of the plant shown in Fig. 1, showing the various ladles and appurtenances. Figs. 3 and 4 are respectively a vertical section and a cross section on the line 4—4 showing an electrically heated mixing ladle.

Referring first to Fig. 1 as showing the preferred arrangement of the apparatus of the plant, A and B are Bessemer converters of say thirteen (13) tons capacity each and arranged in a line at one side of the plant. In line adjacent to these converters are two mixers C and D. These may be tilting vessels heated by gas or electricity or otherwise and having a capacity of one hundred and fifty (150) tons each. In the next line is a row of electric furnaces in two groups indicated at E and F respectively and these may be of about twenty-five (25) tons capacity each.

The converters, mixers and electric furnaces above referred to are fixed except for the tilting movements necessary in charging and pouring from them. On the delivery side of the electric furnaces there are cranes carrying large mixing ladles G and H, the former serving the furnaces E and the latter the furnaces F. These mixing ladles can be moved along the line of the furnaces to receive the metal therefrom and can be moved also transversely and elevated or lowered at will. They may have a capacity of about one hundred (100) tons each. On the next line beyond the mixing ladles is a track J for carrying cars with ingot molds mounted thereon, and over this track in suitable positions are stands K carrying casting ladles L of say twenty-five (25) tons capacity, so that the molds can be run under these casting ladles and then filled therefrom.

The process which I prefer in detail involves the use of a basic converter and mixer and an acid electric furnace. Such process, however, is of especial value in using high phosphorous pig, and such a large plant as I have designed above can be adapted to use pig which is either high or low in phosphorus by merely modifying the linings of the vessels (and, of course, altering the character of the additions and the slags correspondingly). For example, the converter A may be acid lined, the converter B basic lined; and the electric furnaces E may be basic lined, while the furnaces F are acid lined. The mixers C and D would ordinarily be lined alike with basic or neutral lining as the only substantial change therein is a dephosphorization (with a slight incidental desulfurization). The ladles may be acid as usual since there are no chemical operations carried on therein or at least none which involve a consideration of the character of the lining. With the various vessels of the character described the plant can handle non-phosphoric pig most readily in the converter A and furnaces E; and phosphoric pig most readily in the converter B and furnaces F; or two series of operations can be carried on simultaneously using the converter A, mixer C and the four furnaces E in one group, and the converter B, mixer D and four furnaces F in a second group, using the mixing ladles G and H for any desired one or both of the furnace groups.

Fig. 2 illustrates the mode of transferring the metal from one apparatus to the next. This figure shows at M a ladle carried on a track and serving to bring molten pig iron from the blast furnace or cupola. The iron is poured from the ladle M into one end of an iron mixer N of the tilting type, and from the opposite end of this mixer the metal is poured into a ladle O traveling on an elevated track in front of the converters and the iron mixer N, the latter being at one end of the line of the converters. The ladles O are then used to charge the converters and the latter are discharged into a second line of ladles P carried on a track running on a lower level in front of the line of converters. From the ladles P the steel is poured into the stationary steel mixers at one side, these being of the tilting type so that the metal is poured therefrom at the opposite side into a ladle Q carried by a traveling crane R which lifts it and conveys it over to a position in the rear of the electric furnaces where it is tilted to pour its contents into the furnace at the rear, the latter being also of the tilting variety and the steel being poured through a spout at the front into the large mixing ladle G; which is handled by a traveling crane S to raise it and shift it laterally to a point above the small ladles L into which parts of its contents are poured from time to time, the casting ladles L being then used to teem the metal into the ingot molds T which are passed in succession under the stand on which the casting ladles are mounted. In connection with the electric furnaces there is also mounted at the rear of the line a charging apparatus U traveling upon a track parallel with the furnaces and adapted to be used for charging slag-forming materials, lime, ore, scrap, cold metal and any desired additions to the bath in the electric furnace. The charging apparatus U works in connection with cars V running on a parallel track and carrying the materials to be charged. At a lower level and between the cars V and the rear end of the furnace there are provided tracks for running slag cars W up to the furnaces so that the latter can be first tilted backward to pour off the slag before being tilted forward to pour the steel into the mixing ladle.

The mixing ladles G, H or the casting ladles L, or both, may be covered and provided with electrodes in the manner shown in Figs. 3 and 4. The vessel L for example has a nozzle X in the bottom through which the contents are discharged, the flow being regulated by a stopper Y consisting of a steel rod inclosed in hollow bricks and connected to a lever Z on the outside by which it is manipulated. The side of the vessel through which the stopper Y passes is open at the top. The diaphragm 2, however, in connection with a roof 3 incloses the remaining portion of the surface of the metal and the electrodes 4 are let down through the cover 3 and a current caused to pass from one electrode through the metal to the other according to the principle of the Heroult arc furnace, sufficient current being supplied to provide the desired quantity of heat.

The advantages of my invention will be apparent to those skilled in this art. The cost of producing electrically finished steel is greatly reduced; the carbon content of the finished steel is made more uniform; the metal is more completely refined and the slag eliminated to a greater extent than heretofore, while the time of retaining the steel in the electric furnace is reduced. Where the acid lined electric furnace is employed in connection with the basic lined converter, the cost is also further reduced, owing to the cheaper first cost and cost of operating the acid lined electric furnace.

Many variations may be made in the plant, and the different devices making up the plant; and variations may be made in the steps of the process and sub-processes, without departing from my invention.

What I claim is:

1. In the manufacture of steel the method which consists in subjecting phosphoric iron to a roughing-down blowing operation in basic converters, transferring the metal therefrom to a mixer, completing the desired dephosphorizing in said mixer and maintaining a supply therein, and transferring metal from the mixer to an acid electric furnace and refining it therein.

2. In the manufacture of steel the method which consists in blowing iron in basic converters, transferring it therefrom to a non-acid mixer, maintaining a supply in said mixer, transferring metal from the mixer to acid electric furnaces and refining it therein, and transferring it from said electric furnaces to a mixing ladle where it undergoes further refinement and the final product is maintained substantially uniform.

3. In the manufacture of steel the method which consists in blowing iron in basic converters, transferring it therefrom to a non-acid mixer, maintaining a supply in said mixer, transferring metal from said mixer to acid electric furnaces and refining it therein, transferring it from said electric furnaces to a mixing ladle where it undergoes further refinement and the final product is maintained substantially uniform, pouring the metal from said mixing ladle into the casting ladles and thence casting it into molds.

4. In the manufacture of steel the method which consists in blowing iron in basic converters, thereafter refining the blown metal in acid electric furnaces and transferring it from said electric furnaces to a mixing ladle where it undergoes further refinement and the final product is maintained uniform.

5. In the manufacture of steel the method which consists in refining it in electric furnaces and transferring it from said furnaces to a mixer where it undergoes further refinement and elimination of microscopic slag and the final product is maintained substantially uniform in carbon.

6. In the manufacture of steel the method which consists in refining it in electric furnaces and transferring it from said furnaces to a mixing ladle where it undergoes further refinement and elimination of microscopic slag and the final product is maintained substantially uniform in carbon, and pouring the metal from said mixing ladle to casting ladles and thence casting it into molds.

7. In the manufacture of steel the method which consists in refining it in electric furnaces and heating it to a high degree, transferring it from said furnaces while highly heated to a mixer and removing portions only of the molten metal from said mixer from time to time and replenishing it from said furnaces so as to maintain in the mixer a quantity of metal at least as great as that in one of said furnaces and so as to hold such quantity in the mixer long enough to effect a further refinement and elimination of microscopic slag by reason of its high temperature and quiescent condition.

8. The method of making steel consisting in forming steel in a combustion furnace or furnaces, removing the steel to and treating it in a series of electric furnaces, transferring the steel from the electric furnaces to a mixer, mixing the steel therein, and taking the steel from said mixer to the molds.

9. In the manufacture of steel the steps consisting in treating steel in a series of electric finishing furnaces, tapping the steel therefrom into a portable mixer, maintaining a constant pool of steel in said mixer, and tapping steel therefrom at separated intervals while maintaining the pool therein.

10. In the manufacture of steel, the steps consisting of making steel in a combustion furnace or furnaces transferring the steel therefrom to a mixer and mixing it therein, taking portions of said mixed steel to and treating them in a series of electric furnaces, transferring the metal from the electric furnaces to a mixer or mixers, and mixing the refined steel therein.

11. In the manufacture of steel, the steps consisting of blowing molten pig iron in a basic converter and subsequently transferring the metal to and treating it in an electric furnace having a non-basic lining.

12. In the manufacture of steel, the steps consisting of blowing iron in basic converters, transferring the metal therefrom to a mixer, maintaining a pool of steel therein, taking portions of steel from said mixer, and supplying them to and treating them in a series of electric furnaces having a non-basic lining.

13. In the manufacture of steel, the steps consisting of blowing iron in basic converters, transferring the metal therefrom to a mixer, maintaining a pool of steel therein, taking portions of steel from said mixer, and supplying them to and treating them in a series of electric furnaces having a non-basic lining and transferring the metal from the electric furnaces to a mixer.

14. The method which consists in refining steel in electric furnaces, maintaining continuously a supply of molten metal for said furnaces and a second supply in which the refined metal from said furnaces is received, so as to reduce to a minimum the periods during which said furnaces are not operating.

In witness whereof, I have hereunto signed my name in the presence of two subscribing witnesses.

WILLIAM R. WALKER.

Witnesses:
J. H. GEWECKE,
D. ANTHONY USINA.